(12) United States Patent
Kim et al.

(10) Patent No.: US 9,520,749 B2
(45) Date of Patent: Dec. 13, 2016

(54) WIRELESS POWER TRANSMISSION METHOD AND SYSTEM FOR PREVENTING FREQUENCY INTERFERENCE

(71) Applicants: Hyundai Motor Company, Seoul (KR); Kia Motors Corporation, Seoul (KR)

(72) Inventors: Jong-Gyu Kim, Incheon (KR); Kyong-Ho Shon, Kyungki-do (KR); Nam-Woong Hur, Soowon (KR); Sin-Gu Kim, Soowon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 556 days.

(21) Appl. No.: 13/962,209

(22) Filed: Aug. 8, 2013

(65) Prior Publication Data
US 2015/0042167 A1 Feb. 12, 2015

(51) Int. Cl.
*H01F 27/42* (2006.01)
*H01F 37/00* (2006.01)
*H01F 38/00* (2006.01)
*H02J 17/00* (2006.01)
*H02J 7/02* (2016.01)

(52) U.S. Cl.
CPC ............... *H02J 17/00* (2013.01); *H02J 7/025* (2013.01)

(58) Field of Classification Search
CPC ............ H02J 5/005; H02J 7/025; H02J 17/00; H02J 7/0052; H02J 7/04; H02J 7/00; H02J 7/0044; H02J 2007/0001; H02J 2007/0096; H02J 3/383; H02J 7/0027; H02J 7/0054; H02J 7/045

USPC .......................................................... 307/104
See application file for complete search history.

(56) References Cited

U.S. PATENT DOCUMENTS

| | | | | |
|---|---|---|---|---|
| 6,970,680 | B1 * | 11/2005 | Tomoe | H04B 1/1027 455/452.1 |
| 2004/0198237 | A1 * | 10/2004 | Abutaleb | H04B 7/18593 455/78 |
| 2005/0111346 | A1 * | 5/2005 | Santhoff | H04B 1/7163 370/203 |
| 2008/0076351 | A1 * | 3/2008 | Washiro | H04B 5/02 455/41.1 |
| 2008/0231274 | A1 * | 9/2008 | Fontius | G01R 33/3607 324/309 |
| 2009/0289757 | A1 * | 11/2009 | Ballard | G07C 5/008 340/3.1 |
| 2010/0081391 | A1 * | 4/2010 | Suzuki | H04W 16/14 455/67.11 |
| 2012/0153894 | A1 | 6/2012 | Widmer | |

FOREIGN PATENT DOCUMENTS

| | | |
|---|---|---|
| EP | 2521277 A2 | 11/2012 |
| JP | 2008-206297 A | 9/2008 |

* cited by examiner

*Primary Examiner* — Jared Fureman
*Assistant Examiner* — Esayas Yeshaw
(74) *Attorney, Agent, or Firm* — Mintz Levin Cohn Ferris Glovsky and Popeo, P.C.; Peter F. Corless

(57) ABSTRACT

A wireless power transmission method and system for prevention frequency interference is provided to prevent frequency interference and collision between a wireless power transmitter and other devices which use a frequency adjacent to frequency band of the power signal transmitting from the wireless power transmitter. The wireless power transmission method includes outputting a using signal upon use of a wireless device and operating the wireless power transmitter based on whether the using signal is transmitted.

17 Claims, 4 Drawing Sheets

WIRELESS POWER TRANSMISSION METHOD AND SYSTEM FOR PREVENTING FREQUENCY INTERFERENCE

BACKGROUND

Field of the Invention

The present invention relates to a wireless power transmission method and system for preventing frequency interference.

Description of the Related Art

A wireless power transmission system is generally used as a technology for transmitting power between devices that are spaced apart from each other using an induced electromotive force mechanism. In the wireless power transmission system, a known technology is used to enable power to be transmitted between devices arranged separately using a frequency with a specific range which is generally between about 100 and 210 kHz. However, since the wireless power transmission system transmits power using a wireless signal, when other devices using a frequency adjacent to the frequency band of a signal for transmitting power are disposed at a substantially close distance, a malfunction may occur due to frequency interference.

Accordingly, to avoid the frequency interference and collision, a multichannel technology has generally been used in the wireless power transmission system. In a wireless power transmission field, however, a frequency band which is able to be used practically may be limited. Thus, there is a restriction of changing the frequency variously for transmitting power without a wire. Moreover, upon a change of the frequency, power transmission efficiency is consequently varied according to the change of the frequency, and the variation range may be substantially significant.

In another method, a method of shielding electromagnetic waves is used, which reduces a physical area influenced by the electromagnetic waves for the purpose of preventing frequency interference between different devices. The above mentioned method, however, has a disadvantage in that an extra cost is required for additionally installing a shielding member in the electromagnetic wave shielding structure. Moreover, when a wireless power transmission structure needs to be redesigned, the shielding structure applied previously has to be redesigned by re-measuring a radiation pattern whenever a design of wireless power transmitter is changed. Accordingly, there are disadvantages in that the method using the electromagnetic wave shielding is complicated to be developed.

SUMMARY

The present invention provides a structure that outputs a using signal upon the use of an wireless device and controls the operation of a wireless power transmitter based on whether the using signal is transmitted, to prevent frequency interference and collisions between the wireless power transmitter and other devices which use a frequency adjacent to the frequency band of a power signal transmitting from the wireless power transmitter.

In accordance with an aspect of the present invention, a wireless power transmission method for preventing frequency interference in a wireless power system having a wireless power transmitter, an wireless device, and a controller, may include: starting operation of the wireless device and outputting a using signal; and executing, by the controller, the operation of the wireless power transmitter to be stopped when the using signal which the wireless device outputs is received, wherein the wireless power transmitter may generate and transmit a power signal for transmitting power by radio.

The starting of the operation of the wireless device and outputting a using signal may include generating the using signal and transmitting the using signal to the controller in the wireless device. In addition, the starting of the operation of the wireless device and outputting a using signal may further include: generating and outputting the using signal in the wireless device continuously. The starting of the operation of the wireless device and outputting a using signal may further include: generating and outputting the using signal in the wireless device temporarily.

The method may further include: generating a using complete signal upon the stopping of operation and transmitting to the controller temporarily in the wireless device; and operating the wireless power transmitter to be restarted when the controller receives the using complete signal, wherein the starting of the operation of the wireless device and outputting a using signal further includes generating and outputting the using signal in the wireless device temporarily.

The using signal and the using complete signal may have the same frequency waveform. Alternatively, the using signal and the using complete signal may have different frequency waveforms, respectively. Further, the using signal may include the same signal which is used upon communication of the wireless device. The starting of operation of the wireless device and outputting a using signal may include: a starting operation after initially transmitting the using signal and then waiting for a predetermined time in the wireless device.

The method may further include: stopping output of the using signal upon the stopping of operation in the wireless device; and operating the wireless power transmitter to restart when the using signal is not received by the controller. The controller may execute transmission and shut-off of the power signal by shutting off the power or releasing shutting off the power of the wireless power transmitter. In addition, the method may further include: generating a power signal and transmitting the power signal to the wireless device in the wireless power transmitter; and receiving the power signal and supplied with power in the wireless device to provide power.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
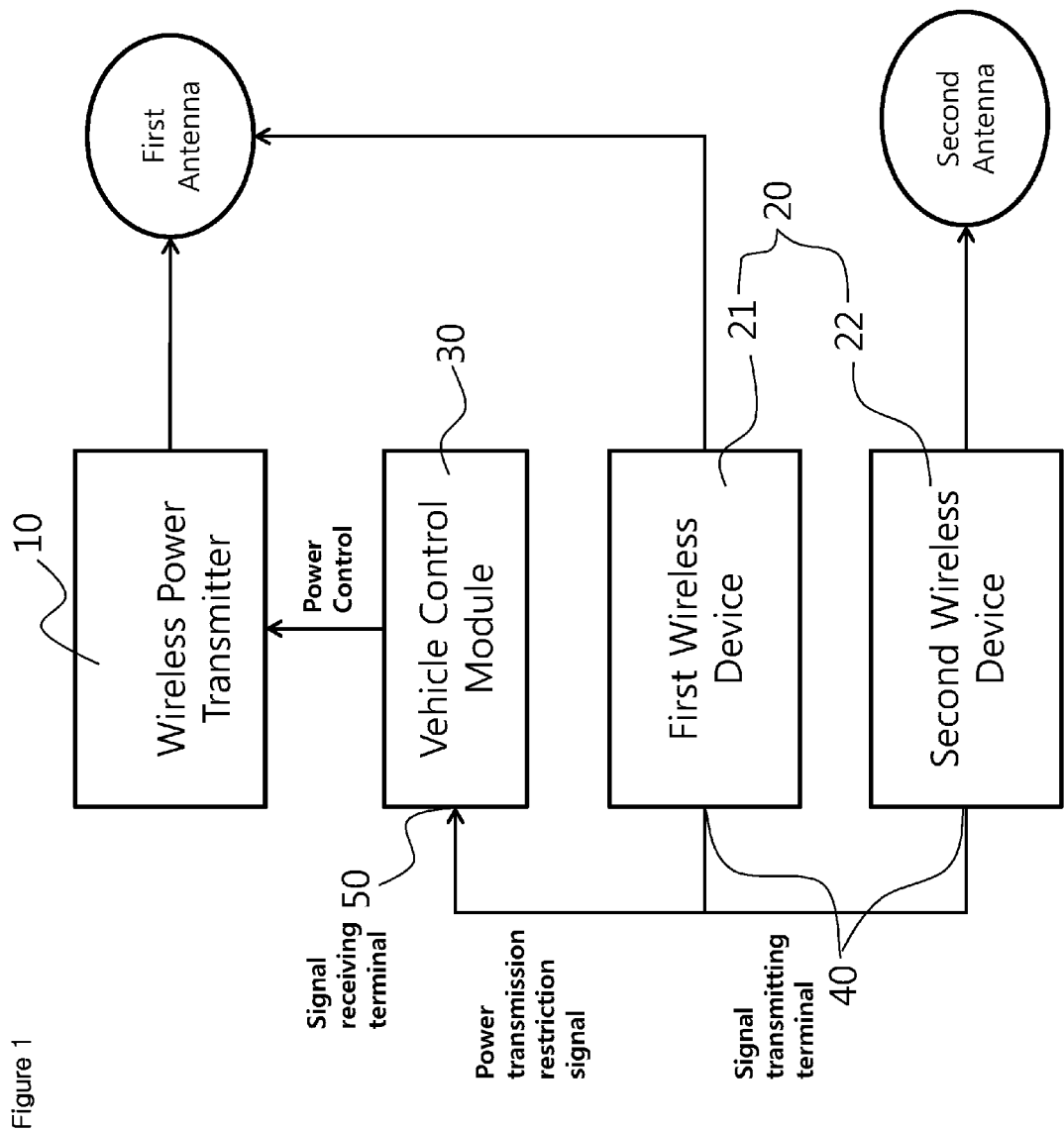
FIG. 1 is an exemplary block diagram illustrating a system which executes a wireless power transmission method for preventing frequency interference according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention are described with reference to the accompanying drawings in detail. Terms and words used in the specification and the claims shall not be interpreted as commonly-used dictionary meanings, but shall be interpreted as those being relevant to the technical scope of the invention based on the fact that the inventor may properly define the concept of the terms to explain the invention in the best way. Therefore, the embodiments and the configurations depicted in the drawings are for illustrative purposes only and do not represent all technical scopes of the embodiments, so it should be understood that various equivalents and modifications may exist at the time of filing this application.

FIG. 1 is an exemplary block diagram illustrating a system which executes a wireless power transmission method for preventing frequency interference according to an exemplary embodiment of the present invention. As shown in the figure, the system that performs a wireless power transmission method for preventing frequency interference may include a wireless power transmitter 10, one or more wireless devices 20, and a controller 30.

The wireless power transmitter 10 may be configured to generate and transmit a power signal using a wireless power transmission technology, and the wireless device 20 may be disposed adjacent to the wireless power transmitter 10 and may be configured to communicate with a frequency adjacent to the frequency which the wireless power transmitter 10 uses (or operates with receiving a power signal transmitted from the wireless power transmitter), and the controller 30 may be configured to communicate with the wireless power transmitter 10 and operate the wireless power transmitter 10 according to a signal output from the wireless device 20.

A first wireless device 21 and a second wireless device 22 are shown in FIG. 1, but the present invention is not limited thereto and it may be possible to provide more wireless devices that may be constituted by other electronic devices using an adjacent frequency which may cause frequency interference with the frequency of the power signal transmitted from the wireless power transmitter 10.

As shown in FIG. 1, the first wireless device 21 and the second wireless device 22 have the same mechanism through which power is supplied and there may be a difference in transmission and reception antenna, i.e. difference between the first antenna and the second antenna. Therefore, one or more wireless devices may be referred to as a "wireless device 20" (e.g., the first wireless device 21 and the second wireless device 22 may be integrated as one wireless device 20)

The word "adjacent" is used as the same meaning in this specification of the present invention as is generally used, and more specifically is used as a meaning that covers the frequency range of the wireless power transmitter 10 or is used as meaning a range in which the frequency interference may be caused due to the transmission frequency of the wireless power transmitter 10. In addition, the word "a wireless device" may be a wireless device that uses a same frequency with the power signal from the wireless power transmitter or an adjacent frequency with the power signal from the wireless power transmitter.

The term "wireless power transmission technology" refers to a known technology that transmits power wirelessly using a power signal of a specific frequency band, for example, a frequency which has a range between about 100 kHz and 210 kHz. In wireless power transmission technology, a wireless power transmitter may be configured to generate the power signal to be included in the specific frequency band and transmit the power signal through a transmitting terminal, and one or more devices to be supplied with power from the wireless power transmitter may be configured to receive the power signal through a receiving terminal thereof, and then may be supplied with power converted from the power signal using induced electromotive force of the power signal.

As shown in the figure, the system adopting the wireless power transmission method for preventing frequency interference may include a wireless power transmitter 10 configured to transmit the power. The wireless power transmitter 10 may include the configuration of the known wireless power transmitter 10, and more particularly a controller configured to operate the system, a power supplier configured to provide power, a power signal converter configured to convert the supplied power to a power signal, an antenna configured to transmit the power signal to an wireless device, and an oscillation converter. Since the configuration of the wireless power transmitter 10 is known, a detailed description thereof will be omitted.

The wireless power transmitter 10 may be configured to stop transmission of the power signal to prevent frequency interference and collision when using the wireless device 20 to be described below. The operation the wireless power transmitter 10 may be performed by the controller 30 to be described below. Thus, the operation of the wireless power transmitter 10 may be contingent on control of the controller 30, and the controller 30 may be configured to operate the wireless power transmitter 10 by shutting off or releasing the shut off the power of the wireless power transmitter 10 for example. The controller 30 may be connected to the wireless power transmitter 10 by a wire or a radio.

The wireless device 20 commonly indicates all known devices that use a frequency adjacent to a frequency of the power signal transmitted by the wireless power transmitter 10, or communicates wirelessly via the wireless power transmitter. In other words, the wireless device 20 may be a device which has a transmission antenna, may be configured to transmit a wireless signal to perform a basic function of the wireless device, and may be configured to use a frequency band adjacent to a specific range thereof which is used by the wireless power transmitter 10.

Upon transmission and reception of a signal, the wireless device 20 may be configured to interfere and collide with the power signal transmitted from the wireless power transmitter 10, thus, when using the wireless device 20 of the present invention, an operation of the wireless power transmitter 10 may be stopped. To perform the above mentioned process, the wireless device 20 may be configured to generate and transmit a using signal to restrict the signal transmission of the wireless power transmission 10. The using signal may be generated by the wireless device 20 to transmit, and may be a specific signal to be additionally generated to output upon operation of the wireless device, and is not limited to the specific signal, and may be a communication signal for communicating in the wireless device 20.

The using signal generated by the wireless device 20 may be transmitted via a signal transmitting terminal 40 mounted on the wireless device 20, and a signal receiving terminal 50 of a controller 30 described below may be configured to receive the using signal to transmit to a controller 30. In particular, the signal transmitting terminal 40 and the signal receiving terminal 50 may be an antenna (e.g., a second antenna of FIG. 1) that transmits a wireless signal of the wireless device 20, and may be further configured to separate from the antenna to transmit the wireless signal. The antenna is well known and thus a detailed description thereof will be omitted.

In the exemplary embodiment of the present invention, the signal transmitting terminal 40 and the signal receiving terminal 50 may be configured to transmit and receive the signal to and from each other via the wireless communication and in another exemplary embodiment of the present invention, the signal transmitting terminal 40 may be connected to the signal receiving terminal 50 of the controller by wire.

The wireless device 20 and the wireless power transmitter 10 may not operate each other simultaneously, and when at least one of the wireless devices 20 attempts to start operating while the wireless power transmitter 10 operates, the signal transmitting terminal 40 of the wireless device 20 may be configured to output the using signal and the controller 30 that receives the using signal may be configured to stop the operation of the wireless power transmitter 10 temporarily to prevent frequency collision. In particular, the wireless device 20 may be configured to consistently transmit the using signal during operation and the controller 30 may be configured to operate the wireless power transmitter 10 to be stopped constantly while receiving the using signal. Thus, the wireless power transmitter 10 may be controlled to not be operated while the wireless device is operating.

In another exemplary embodiment of the present invention, however, the wireless device 20 may be configured to transmit the using signal in the initial operation and the controller may be configured to stop the operation of the wireless power transmitter 10 upon the initial reception of the using signal. Additionally, the wireless device 20 may be configured to generate and transmit a using complete signal when the operation is stopped, and the controller 30 may be configured to operate the wireless power transmitter 10 again. Thus, the wireless power transmitter 10 may be controlled to not be operated while the wireless device is operating. In this exemplary embodiment, the using signal and the using complete signal may have different frequencies, but it is well known to the skilled person that these signals may have about the same frequency.

Moreover, in the exemplary embodiment of the present invention, the wireless device 20 may be configured to start to operate after a predetermined set time after transmitting the using signal to prevent frequency interference and collision in advance.

The controller 30 may be configured to receive the using signal which is output from the wireless device 20 and is coupled to the wireless power transmitter 10 to operate the wireless power transmitter 10. The operation of the wireless power transmitter 10 may be controlled by shutting off the power or releasing the shut off of the power which supplied thereto, but this invention is not limited thereto.

The controller 30 may be a type of electric control unit (ECU), for example, such as a vehicle control module that operates all electric devices within a vehicle and is well known, and thus, the detailed description thereof is omitted. The controller 30 may further include a signal receiving terminal 50 configured to receive the using signal transmitted from the wireless device 20 to be coupled to the wireless device 20. An antenna configured to transmit the power signal may be used as the signal receiving terminal. The controller 30 may be configured to operate the wireless power transmitter 10 based on the using signal received from the signal receiving terminal 50. In addition, the controller 30 may be configured to operate the wireless power transmitter 10 to be stopped when the using signal from the signal receiving terminal 50 is received.

Furthermore, the controller 30 may be connected to the wireless power transmitter 10 via communication network within a vehicle such as controller area network (CAN), local interconnect network (LIN), Flex ray, etc., but the present invention is not limited thereto and includes known wireless or wire communication technology. When using the communication network within a vehicle such as CAN, LIN and Flex ray, additional communication channels may be omitted and extra communication channels within a vehicle control module may be omitted.

In another exemplary embodiment of the present invention, the controller 30 may communicate with the wireless power transmitter 10 via a wireless communication. The controller 30 may be configured to transmit a using restriction signal continuously during a predetermined time to stop the operation of the wireless power transmitter 10, and the wireless power transmitter 10 may be stopped while the wireless power transmitter 10 receives the using restriction signal.

In another exemplary embodiment of the present invention, the controller 30 may communicate with the wireless power transmitter 10 via a wireless communication. The controller 30 may be configured to transmit a using restriction signal to stop the operation of the wireless power transmitter 10, and then may be configured to transmit a using restriction ending signal after a predetermined waiting period to allow the controller 30 to stop the operation of the wireless power transmitter 10 during the predetermined waiting period. In particular, the wireless power transmitter 10 may be stopped upon the receipt of the using restriction signal, and then the wireless power transmitter 10 may be operated upon the receipt of the using restriction ending signal. The using restriction signal and the using restriction ending signal may have the different frequencies; however, the signals may also have the same frequency.

Moreover, in the exemplary embodiment of the present invention, the controller may be configured to stop the operation of the wireless power transmitter during a predetermined time when the vehicle is started. The risk of interference between the wireless device and the wireless power transmitter may increase when the vehicle is started since any electric power may be automatically provided to the wireless power transmitter when the vehicle is started. Thus, in the exemplary embodiment of the present invention, the controller may be configured to stop the operation of the wireless power transmitter during a predetermined time when the vehicle is started to prevent the chance of interference between the wireless device and the wireless power transmitter.

Figure 2:
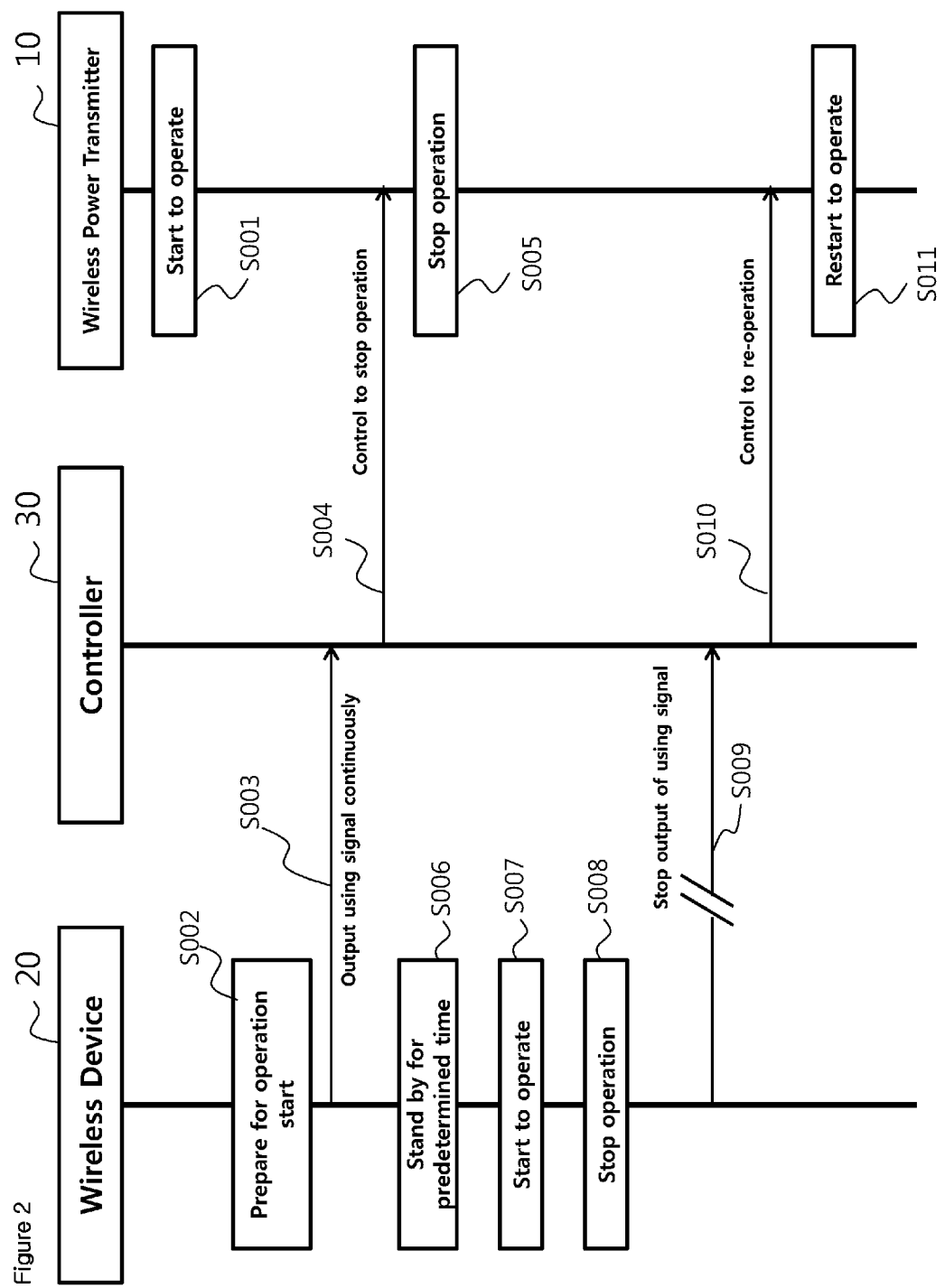
FIG. 2 is an exemplary flowchart illustrating a wireless power transmission method for preventing frequency interference according to a first exemplary embodiment of the present invention.

FIG. 2 is an exemplary flowchart illustrating a wireless power transmission method for preventing frequency interference according to a first exemplary embodiment of the present invention. A wireless device 20 shown in FIG. 2 is illustrated as one block for convenience of the description, but may correspond to one or more devices.

When a wireless power transmitter 10 starts to operate (S001), the wireless power transmitter 10 may be configured to generate a power signal by receiving power from a power supply unit and may be configured to transmit the power signal via a signal transmitting terminal. The power signal transmitted from the wireless power transmitter 10 may be provided to each device which is supplied with power via the wireless power transmitter 10 and uses the power. In one exemplary embodiment of the present invention, the wireless device 20 may be configured to receive the power signal from the wireless power transmitter 10, and then may be supplied with the power by an induced electromotive force, and may be configured to use the power to perform operation or store the power in a power storing unit configured therein autonomously, but the present invention is not limited thereto.

When the wireless device 20 is ready to start to operate (S002), for example, when a user starts the operation, or another device or a controller executes the start operation, the wireless device 20 may be configured to generate the using signal and output the using signal via the signal transmitting terminal 40 before the operation (S003). In an exemplary embodiment of the present invention, the using signal may be generated and output consistently during operation of the wireless device 20.

The controller 30 may be configured to stop operation of the wireless power transmitter 10 when the using signal which is transmitted by the wireless device 20 from the signal transmitting terminal 50 is received (S005). The wireless power transmitter 10 may be operated to stop the operation thereof by shutting off the power supplied thereto, or may be operated to stop the operation autonomously. The step of stopping the operation of the wireless power transmitter 10 is not limited thereto and is well known, and thus a detailed description is omitted. In this step, the controller 10 may be configured to receive the using signal transmitted from the wireless device 20 continuously, and may be configured to continuously stop the operation of the wireless power transmitter 10 while receiving the using signal.

Moreover, after transmitting the using signal in the step S003, the wireless device 20 may be configured to wait for a predetermined stand-by time (e.g., a waiting period) (S006). The stand-by-time may be used to compensate for a time while the using signal transmitted from the wireless device 20 is received by the vehicle control module 30, and the operation of the wireless power transmitter 10 is stopped by the vehicle control module 30 to stop transmission of the power signal, to prevent interference and collision between the power signal transmitted from the wireless power transmitter 10 and the using signal transmitted from the wireless device 20. Thus, the wireless device 20 may be configured to transmit a signal after the predetermined stand-by time of the wireless power transmitter 10.

The wireless device 20 may be configured to start to operate after standing by for the predetermined stand-by time of the step S006 to transmit the using signal (S007). In the exemplary embodiment of the present invention, the using signal transmitting in the step S007 may be the same signal as the using signal transmitting in the steps S002 and S003, but it is well-known that the using signals may be also different. In other words, in another exemplary embodiment of the present invention, the signal which is output in steps S002 and S003 may be a signal to control operation of the wireless power transmitter 10, and the signal which is output in step S007 may be a signal which is used for communication of the wireless device 20.

When the use of the wireless device 20 is completed and the operation thereof is stopped (S008), the using signal which is generated and output from the wireless device 20 may also be stopped to be output (S009). The controller 30 may be configured to release an operation stop control of the wireless power transmitter 10 that corresponds to the disappearance of the signal which is being consistently received, and may be configured to output the power signal by re-operating the wireless power transmitter 10 (S010). Thus, the wireless power transmitter 10 may be configured to start to operate again according to supplied power which is shut off by the controller 30 (S011).

Figure 3:
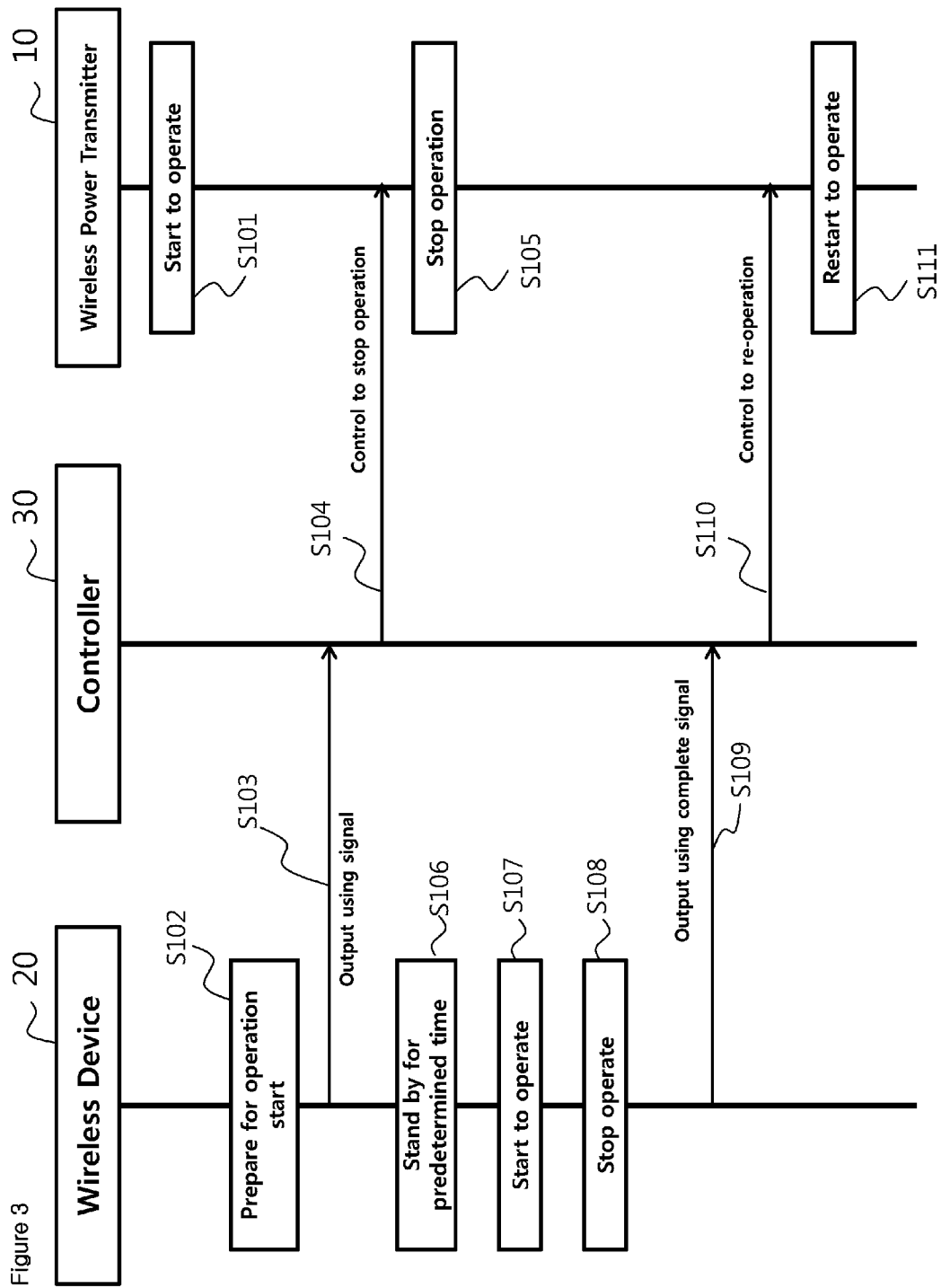
FIG. 3 is an exemplary flowchart illustrating a wireless power transmission method for preventing frequency interference according to a second exemplary embodiment of the present invention.

FIG. 3 is an exemplary flowchart illustrating a wireless power transmission method for preventing frequency interference according to a second exemplary embodiment of the present invention. The second exemplary embodiment of the present invention is configured the same as the first exemplary embodiment, but the controller may be configured to recognize an operation start step and an operation complete step of the wireless device 20 by temporarily outputting the using signal from the wireless device 20 in an operation start ready step and temporarily outputting again in an operation stop step. Thus, each step of the second exemplary embodiment may correspond to the step of the first exemplary embodiment except the steps described below.

While in step S002 of the first exemplary embodiment, the wireless device 20 may be configured to consistently generate and output a using signal before starting to operate and in step S102 of the second exemplary embodiment of the present invention, the wireless device 20 may be configured to temporarily output the using signal before starting operation. Thus, the wireless device 20 may be configured to only output the using signal in the operation start ready step to perform differently from the first exemplary embodiment.

In step S108 of the second exemplary embodiment of the present invention, the wireless device 20 may be configured to temporarily output the using signal upon stopping the operation of the wireless device 20 once more. The wireless device 20 may be configured to only temporarily output the using signal in the operation stop step, differently from the first exemplary embodiment. Thus, the controller 30 may be configured to recognize the operation start step and the operation stop step of the wireless device 20 by receiving the using signal which is temporarily output from the wireless device 20.

In the second exemplary embodiment of the present invention, the using signal may be substantially the same signal which is used in communication with the wireless device 20, similar to the first exemplary embodiment. Additionally, the using signal may be a specific signal to recognize the operation start step and the operation stop step of the wireless device 20 to control the operation of the wireless power transmitter 10. In particular, the using signal outputting in the operation start step may have the same or different frequency waveform as the using signal outputting in the operation stop step. When the signals have a different frequency, the wireless device 20 may be configured to output the using signal in the operation start and output the using complete signal in the operation stop.

Figure 4:
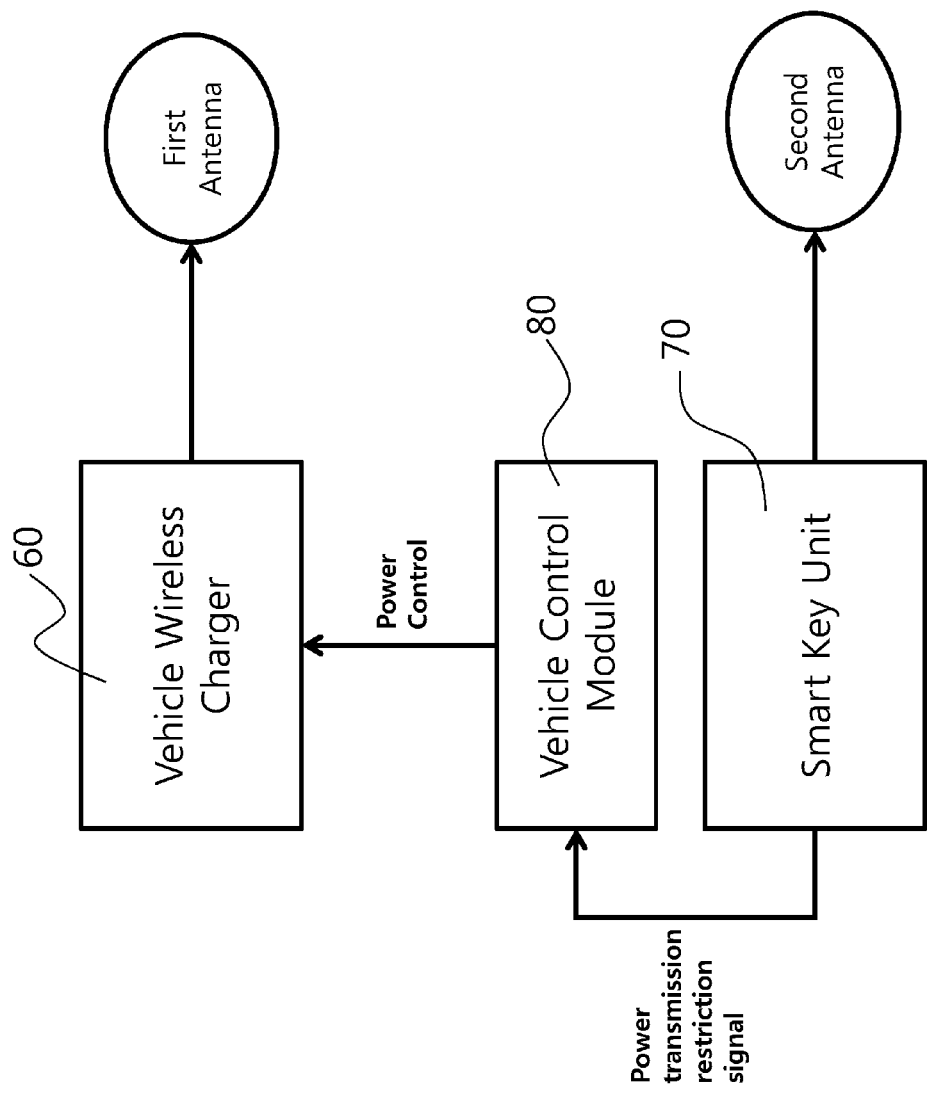
FIG. 4 is an exemplary block diagram illustrating a system which applies a wireless power transmission method for preventing frequency interference according to an exemplary embodiment of the present invention.

FIG. 4 is an exemplary block diagram illustrating a system which applies a wireless power transmission method for preventing frequency interference according to an exemplary embodiment of the present invention. As shown in the figure, the embodiment of FIG. 4 may include a vehicle wireless charger 60, a smart key unit (SMK Unit) 70, and a vehicle control module 80 which corresponds to the wireless power transmitter 10, the wireless device 20, and the controller 30, respectively.

The vehicle wireless charger 60 may be configured to transmit a power signal via a first antenna while the vehicle wireless charger 60 is operating, and the power signal may be configured to interrupt searching for an low frequency (LF) signal of the smart key unit 70 using a frequency adjacent to a frequency band used by the power signal, for example, about 125 kHz. Therefore, the smart key unit 70 may be configured to request to temporarily stop operation of the vehicle wireless charger 60 by transmitting a power transmission restriction signal to the vehicle control module 80 to search for the LF signal, and the vehicle control module 80 may be configured to stop the vehicle wireless charger 50 by shutting off the power supplied to the vehicle wireless charger 60. Accordingly, the smart key unit 70 may be configured to search for the LF signal via a second antenna without signal interference after the vehicle wireless charger 60 stops operation.

When the searching operation for the LF signal in the smart key unit 70 is terminated, the smart key unit 70 may be configured to stop transmission of the power transmission restriction signal which is transmitting to the vehicle control module 80, and the vehicle control module 80 may be configured to re-operate the vehicle wireless charger 60 by supplying the power to the vehicle wireless charger 60 again.

According to exemplary embodiments of the present invention configured as above, a drawback of requiring increased time in designing of the system, including the measuring of a radiation pattern, selecting and applying a shield material, and designing a physical shape, etc., for a technology that prevents frequency collision by electromagnetic shielding of the conventional art, may be eliminated by outputting a using signal upon use of an wireless device and by operating the wireless power transmitter based on whether to transmit the using signal, to prevent interference of a power signal transmitted by a wireless power transmitter, and also time for designing the system may be reduced by modifying software in an wireless device and a battery control management (BCM).

Moreover, in a wireless power transmitter of the conventional art, the cost increases due to the use of a shielding material at the stage of manufacturing a wireless power transmitter to prevent interference and collision using electromagnetic shielding, whereas a wireless power transmitter of the present invention is configured not to require additional shielding materials at the stage of manufacturing a wireless power transmitter, and thus extra cost is not incurred at the early stage of design.

Furthermore, according to the present invention, a communication unit that prevents frequency collision of the wireless charger is not embedded in the wireless charger, thus reducing manufacturing cost of a wireless charger for preventing frequency collision.

While the invention has been shown and described with reference to exemplary embodiments thereof, it will be understood by those skilled in the art that various changes in form and details may be made therein without departing from the spirit and scope of the invention as defined by the accompanying claims.

What is claimed is:

1. A wireless power transmission method for preventing frequency interference in a wireless power system having a wireless power transmitter, a wireless device, and a controller, comprising:
   transmitting, by the wireless device, a using signal to the controller temporarily indicating that the wireless device is in use when the use of the wireless device starts;
   receiving, at the controller, the using signal transmitted by the wireless device;
   controlling, by the controller, the wireless power transmitter to be stopped when the using signal is received at the controller;
   generating, by the wireless device, a using complete signal indicating that the wireless device is no longer in use when the use of the wireless decide ends; and
   controlling, by the controller, the wireless power transmitter to be restarted when the using complete signal is received at the controller, where
   the wireless power transmitter generates and transmits a power signal for transmitting power by radio, and
   the controlling of the wireless power transmitter to be stopped includes stopping, by the controller, the operation of the wireless power transmitter during a predetermined waiting period when the controller receives the using signal by transmitting a using restriction signal and then transmitting a using restriction ending signal after the predetermined waiting period.

2. The method of claim 1, wherein the transmitting of the using signal includes:
generating, by the wireless device, the using signal; and
transmitting, by the wireless device, the using signal to the controller.

3. The method of claim 1, wherein the transmitting of the using signal includes:
transmitting, by the wireless device, the using signal continuously.

4. The method of claim 1, wherein the using signal and the using complete signal have the same frequency waveform.

5. The method of claim 1, wherein the using signal and the using complete signal have different frequency waveforms, respectively.

6. The method of claim 1, wherein the controlling of the wireless power transmitter to be stopped includes:
stopping, by the controller, the operation of the wireless power transmitter by transmitting a using restriction signal continuously during a predetermined time when the controller detects the using signal.

7. The method of claim 1, wherein the using signal is the same signal which is used upon communication of the wireless device.

8. The method of claim 1, wherein the transmitting of the using signal includes:
starting, by the wireless device, operation after initially transmitting the using signal and waiting for a predetermined time.

9. The method of claim 1, further comprising:
stopping, by the wireless device, the transmission of the using signal upon the stopping of operation of the wireless device; and
restarting, by the controller, the wireless power transmitter when the using signal is not received.

10. The method of claim 1, further comprising:
operating, by the controller, transmission and shutoff of the power signal by shutting off the power of the wireless power transmitter or releasing the shut off of the power of the wireless power transmitter.

11. The method of claim 1, wherein the power signal is transmitted to the wireless device to supply the wireless device with power.

12. The method of claim 1, wherein the wireless device is a smart key unit that communicates with the controller by radio.

13. The method of claim 1, wherein the controller includes a vehicle control module that communicates with the wireless device, and wherein the wireless power transmitter is connected to the controller.

14. The method of claim 13, wherein the wireless power transmitter is connected to the controller by a wire or via a controller area network (CAN) communication network within a vehicle.

15. The method of claim 1, further comprising:
stopping, by the controller, operation of the wireless power transmitter during a predetermined time when a vehicle is started.

16. A wireless power transmission system for preventing frequency interference, comprising:
a wireless power transmitter configured to generate and transmit a power signal for transmitting power by radio;
a wireless device configured to transmit a using signal to a controller temporarily indicating that the wireless device is in use when the use of the wireless device starts and generate a using complete signal indicating that the wireless device is no longer in use when the use of the wireless device ends; and
the controller configured to receive the using signal transmitted by the wireless device, control the wireless power transmitter to be stopped when the using signal is received at the controller, and control the wireless power transmitter to be restarted when the using complete signal is received at the controller,
wherein the controller is further configured to stop the operation of the wireless power transmitter during a predetermined waiting period when the controller receives the using signal by transmitting a using restriction signal and then transmitting a using restriction ending signal after the predetermined waiting period.

17. A non-transitory computer readable medium containing program instructions executed by a controller, the computer readable medium comprising:
program instructions that control a wireless device to transmit a using signal to the controller temporarily indicating that the wireless device is in use when the use of the wireless device starts;
program instructions that receive the using signal transmitted by the wireless device;
program instructions that control a wireless power transmitter to be stopped when the using signal output by the wireless device is received;
program instructions that control the wireless device to generate a using complete signal indicating that the wireless device is no longer in use when the use of the wireless device ends; and
program instructions that control the wireless power transmitter to be restarted when the using complete signal is received at the controller, wherein
the wireless power transmitter generated and transmits a power signal for transmitting power by radio, and
wherein the control of the wireless power transmitter to be stopped includes stopping the operation of the wireless power transmitter during a predetermined waiting period when the controller receives the using signal by transmitting a using restriction signal and then transmitting a using restriction ending signal after the predetermined waiting period.

* * * * *